Oct. 4, 1932.  H. HYMANS  1,881,358
DISK HARROW
Filed June 27, 1930
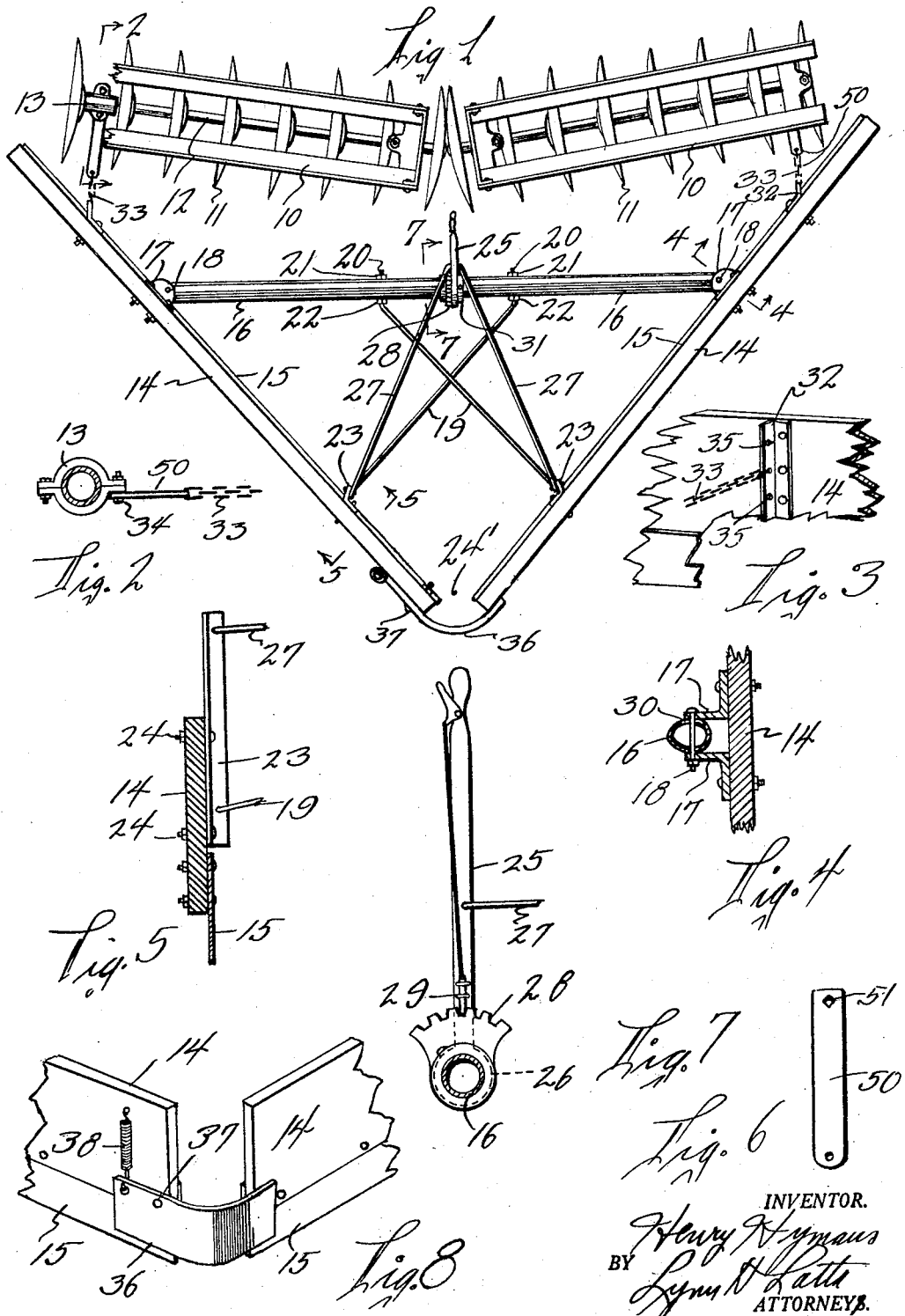
INVENTOR.
Henry Hymans
BY Lynn H Latta
ATTORNEYS.

Patented Oct. 4, 1932

1,881,358

UNITED STATES PATENT OFFICE

HENRY HYMANS, OF HULL, IOWA

DISK HARROW

Application filed June 27, 1930. Serial No. 464,193.

My invention relates to disk harrows and has for its object to provide a drag to be used in connection with the disk harrow for conveying the dirt thrown outwardly by the disks back to its original position before it is engaged by the disks.

One of the problems in a drag of this character is that of arranging the drag so that it will travel smoothly in a horizontal plane without riding upwardly over the mound of dirt which it tends to produce. I find that this problem is very satisfactorily solved by the arrangement of a pair of blades inclined rearwardly and inwardly from the ends of the harrow and spaced apart at their inner ends. This spacing allows the superfluous earth to escape from the drag and a tendency of the earth to pile at the apex of the drag is therefore eliminated.

A further object of the invention is to provide means for smoothing down the ridge which would otherwise be formed by the earth escaping from between the blades. In this connection it is also my object to provide a device which will give sufficiently so as to prevent clogging.

Another object of my invention is to provide a simple and efficient arrangement for hitching the drag to the harrow.

A further object is to provide a drag that is adjustable to meet various conditions of harrowing. Under some conditions, the dirt is very loose and there will be a much greater tendency to pile because of the greater amount of earth that will be carried inwardly by the drag. Under other conditions the earth will be much harder and firmer and less pulverized and a smaller amount will be moved. In obtaining adjustability, it is my purpose to provide an arrangement by means of which the drag may be so adjusted that the tendency to pile is kept at a minimum and yet at the same time sufficient earth is moved so as to fill the ridge left by the disks of the harrow.

Another object of my invention is to provide a structure of very simple, durable and inexpensive construction for accomplishing the above objects named.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Fig. 1 is a plan view of a harrow and drag embodying my invention.

Fig. 2 is a sectional view taken on the line 2—2 of Fig. 1.

Fig. 3 is a perspective view of the connection of the hitch to the drag.

Fig. 4 is a detail, sectional view taken on the line 4—4 of Fig. 1.

Fig. 5 is a detail, sectional view taken on the line 5—5 of Fig. 1.

Fig. 6 is a detail view of the hitch tongue.

Fig. 7 is a sectional view taken on the line 7—7 of Fig. 1 and

Fig. 8 is a perspective view of the rear end of the drag.

I have used the reference character 10 to indicate generally the frame of a disk harrow of common construction. It will be understood that only a portion of the harrow is shown in the drawing since it is of conventional design and its construction is now varied for the purpose of attaching my drag thereto.

The disks are indicated at 11, the disk shaft at 12 and the bearings for the shaft 12 are shown at 13.

The drag comprises a pair of arms 14 provided with blades 15 to engage the earth. The arms 14 are hinged together by means of a cross beam 16, preferably a cylindrical tube. The beam 16 is hinged between brackets 17 secured to the respective arms 14. Bolts 18 extend through the brackets 17 and the ends of the beam 16.

It will now be seen that the arms are so hinged that they may swing to vary their angle of divergence. The rear extremities of the arms are connected to the beam 16 by fulcrum rods 19 which are adjustably mounted in the beam by means of the threaded shanks 20 and nuts 21 and 22. Posts 23, preferably of angle iron, are secured as at 24 to the arms 14 and project above the upper regions of the arms as shown. The posts 23 also project below the central regions of the arms to provide means for attachment of the fulcrum rods 19. The rods 19 are hooked through the flanges of the posts 23 as shown in Fig. 5.

It will now be seen that by adjusting the nuts 21 and 22, the distance between the inner ends of the arms 14 and the central region of the beam 16 may be increased or decreased. By so varying the angular positions of the arms, the space 24' between the inner ends of the blades 15 may be increased or decreased.

The foregoing description of the variation of the space 24' assumes the constant vertical position of the arms 14 and blades 15. However, it will be seen that the space 24' at the lower extremities of the blades may be increased or decreased by tilting the blades around axes extending longitudinally of the blades. To this end I provide an adjusting lever 25 which is loosely mounted on the beam 16 as indicated in Fig. 6, being provided at its lower end with a sleeve 26 encircling the beam and being connected to the upper ends of the posts 23 by means of rods 27. A sector 28 is secured to the beam 16 and co-operates with a dog 29 of conventional construction.

At lease one of the openings of the beam 16 through which the bolts 18 are passed is a slotted or enlarged opening as at 30 in Fig. 4, thus allowing the arms 14 to hinge to a certain extent around longitudinal axes.

It will now be seen that by swinging the lever 25 away from the harrow the posts 23 at their upper ends will be pushed rearwardly and that the arms 14 will hinge around the rear ends of the fulcrum rods 19, causing the blades 15 to tilt forwardly and inwardly. Correspondingly the distance between the inner corners of the blades will be decreased. This may be done while the harrow is in operation, the lever 25 being situated just behind the seat of the operator where it is convenient and accessible.

The lever 25 is mounted between the sector 28 and a collar 31 secured to the beam 16.

The outer ends of the arms and blades extend laterally beyond the extremities of the harrow. Thus the blades will catch the dirt that is thrown by the outermost disks.

The tilting of the blades away from the perpendicular also provides for adjustment of the digging effect of the blades. For instance by tilting them forwardly, they will dig deeper and by tilting them rearwardly, they will ride higher.

The hitch comprises a pair of angle plates 32 secured to the arms 14 and chains or pull elements 33 secured to the angle plates 32 and to one of the bolts 34 of the bearing 13.

The bolts 34 in most harrows of this type are provided with squared shanks and the chains 33 are secured to these squared shanks by means of tongues 50 provided with squared openings 51 receiving the squared shanks of the bolts. The tongues 50 extend rearwardly beyond the edges of the disks 11; the bolts 34 hold them rigidly against lateral swinging and thus the hitch is safeguarded against contacting with the edges of the disks. This is thought to be evident from the drawing.

The angles plates 32 are provided with a series of holes 35, into which the chains 33 may be hooked. By hooking the chain into a lower series of holes, the harrow may be adjusted to dig deeply. It will be remembered that the beam 16 and the bracing arrangement of the fulcrum rods 19 and adjusting rods 27 determines rigidly the vertical tilt of the blades.

The scraper arm 36 closes the space 24' to such an extent that it will smooth down the ridge of earth produced by the blades. The scraper is pivoted at 37 to one of the arms 14 and a spring 38 secured between the arm 14 and the projecting end of the scraper serves to pull the working end of the scraper downwardly against the earth and at the same time to allow the working end of the scraper to move upwardly sufficiently to ride smoothly over the ridge of earth produced by the blades 15.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In combination with a disk harrow, a drag hitched thereto comprising a pair of blades positioned in substantially vertical planes converging rearwardly, a beam positioned horizontally and transversely to the direction of travel of the harrow and hinged at its ends to the inner sides of the blades, a lever fulcrumed on said beam and a pair of rods connecting the lever to the blades whereby movement of the lever will vary the vertical tilt of the blades.

2. In combination with a disk harrow, a drag hitched thereto comprising a pair of blades positioned in substantially vertical planes converging rearwardly, a beam positioned horizontally and transversely to the line of travel of the harrow, said beam being attached at its ends to the inner sides of the blades and rods connecting the intermediate region of the beam to the blades near their rear ends.

3. In combination with a disk harrow, a drag hitched thereto comprising a pair of blades positioned in substantially vertical planes converging rearwardly, a beam positioned horizontally and transversely to the line of travel of the harrow, and hinged at its ends to the inner sides of the blades, a pair of fulcrum rods secured to the beam and pivotally attached to the blades near their rear ends, a lever fulcrumed upon the beam and a pair of adjusting rods pivoted to the lever and attached to the blades substantially above the pivots of said fulcrum rods.

4. In combination with a disk harrow, a drag hitched thereto comprising a pair of blades positioned in substantially vertical planes converging rearwardly, a beam positioned horizontally and transversely to the line of travel of the harrow, and hinged at its ends to the inner sides of the blades, a pair of fulcrum rods secured to the beam and pivotally attached to the blades near their rear ends, a lever fulcrumed upon the beam and a pair of adjusting rods pivoted to the lever and attached to the blades substantially above the pivots of said fulcrum rods, the fulcrum rods being adjustable transversely of the beam to vary the spacing between the rear ends of the blades and the central region of the beam.

5. In combination with a disk harrow, a drag hitched thereto comprising a pair of blades positioned in substantially vertical planes converging rearwardly, a beam positioned horizontally and transversely to the line of travel of the harrow, said beam being attached at its ends to the inner sides of the blades and rods connecting the intermediate region of the beam to the blades near their rear ends, said rods being adjustable transversely of the beam to vary the spacing between the rear ends of the blade and the central region of the beam.

6. In combination with a disk harrow, a drag hitched thereto comprising a pair of blades positioned in substantially vertical planes converging rearwardly and spaced apart at their rear ends, a scraper pivoted to the rear face of one of the blades and projecting across the space between the ends of the blades and a spring to resiliently urge the scraper downwardly into working position.

7. In combination with a disk harrow, a drag hitched thereto comprising a pair of blades positioned at substantially vertical planes converging rearwardly and spaced apart at their rearward ends, means for adjusting the vertical tilt of the blades, a scraper pivoted to the rear face of one of the blades, and a spring pivotally connected in vertical relation from one blade to the scraper to resiliently urge the scraper downwardly into working position.

8. In combination with a disk harrow, a drag hitched thereto comprising a pair of blades positioned in substantial vertical planes converging rearwardly, a beam positioned horizontally and transversely to the direction of travel of the harrow and hinged at its ends to the inner sides of the blades, a lever fulcrumed on said beam and a pair of rods connected to the blades, whereby movement of the lever will vary the vertical tilt of the blades, a scraper pivoted to the rear face of one of the blades, and a spring pivotally connected in vertical relation from one blade to the scraper to resiliently urge the scraper downwardly into working position.

9. In combination with a disk harrow, a drag hitched thereto comprising a pair of blades positioned in substantially vertical planes converging rearwardly, a beam positioned horizontally and transversely to the line of travel of the harrow and hinged at its ends to the inner sides of the blades, a pair of fulcrum rods secured to the beam and pivotally attached to the blades near their rear ends, a lever fulcrumed upon the beam and a pair of adjusting rods pivoted to the lever and attached to the blades substantially above the pivot of said fulcrum rods, the fulcrum rods being adjustable transversely of the beam to vary the spacing between the rear ends of the blades and the central region of the beam, a scraper pivoted to the rear face of one of the blades, and a spring pivotally connected in vertical relation from one blade to the scraper to resiliently urge the scraper downwardly into working position.

10. In combination with a disk harrow, a drag hitched thereto comprising a pair of blades positioned in substantially vertical planes converging rearwardly, a beam positioned horizontally and transversely to the line of travel of the harrow, said beam being attached at its ends to the inner sides of the blades and rods connecting the intermediate region of the beam to the blades near their rear ends, said rods being adjustable transversely of the beam to vary the spacing between the rear ends of the blades and the central region of the beam, a scraper pivoted to the rear end of one of the blades, and a spring pivotally connected in vertical relation from one blade to the scraper to resiliently urge the scraper downwardly into working position.

Signed this 21st day of June, 1930, in the county of Woodbury and State of Iowa.

HENRY HYMANS.